US012410006B2

(12) United States Patent
Weber

(10) Patent No.: US 12,410,006 B2
(45) Date of Patent: Sep. 9, 2025

(54) LOCKING GARBAGE CAN DEVICE

(71) Applicant: Adrian Weber, West Hempstead, NY (US)

(72) Inventor: Adrian Weber, West Hempstead, NY (US)

( * ) Notice: Subject to any disclaimer, the term of this patent is extended or adjusted under 35 U.S.C. 154(b) by 0 days.

(21) Appl. No.: 18/067,765

(22) Filed: Dec. 19, 2022

(65) Prior Publication Data

US 2023/0192400 A1 Jun. 22, 2023

Related U.S. Application Data

(60) Provisional application No. 63/292,503, filed on Dec. 22, 2021.

(51) Int. Cl.
*B65F 1/16* (2006.01)
*E05B 47/00* (2006.01)

(52) U.S. Cl.
CPC ........ *B65F 1/1615* (2013.01); *E05B 47/0038* (2013.01)

(58) Field of Classification Search
CPC .. B65F 1/1615; E05B 47/0038; E05B 47/004; E05C 9/04
USPC ................ 220/230, 323; 292/251.5, DIG. 11
See application file for complete search history.

(56) References Cited

U.S. PATENT DOCUMENTS 2,481,429 A * 9/1949 Kerr ........................... B60J 9/02 292/183
3,596,958 A * 8/1971 Bowerman ......... E05B 47/0038 292/201
4,384,656 A * 5/1983 McQuiston ........... B65F 1/1615 220/908
4,489,851 A * 12/1984 Russ ...................... B65D 45/28 220/323
4,534,488 A * 8/1985 Boggs .................... B65D 45/28 220/323
5,367,891 A * 11/1994 Furuyama ............ A44C 5/2057 63/3
6,622,883 B1 * 9/2003 Wu .................. H01L 21/67373 220/323
7,267,378 B2 * 9/2007 Drumm ................. E05C 19/163 292/DIG. 60
10,894,643 B2 * 1/2021 Leary ................. A47G 19/2227
11,345,540 B1 * 5/2022 DiBartolo ............. B65F 1/1623
2007/0228043 A1 * 10/2007 Perruccio .............. B65F 1/1615 220/323

* cited by examiner

*Primary Examiner* — James N Smalley
(74) *Attorney, Agent, or Firm* — Brennan, Manna & Diamond, LLC

(57) ABSTRACT

The present invention relates to a locking garbage can device primarily comprised of a garbage can body with at least one actuator catch, a lid comprised of at least one rod with at least one actuator magnet, and a housing with at least one housing magnet. The lid is comprised of a magnetic locking mechanism that repels the actuator magnet of the rod via like-poled magnetic fields into a catch located in the garbage can body such that the lid cannot be removed from the body. By turning the housing, the housing spins such that a magnet with an opposite polarity of the actuator magnet of the rod attracts the rod toward the housing such that it disengages the catch and the lid can be lifted from the body.

12 Claims, 4 Drawing Sheets

LOCKING GARBAGE CAN DEVICE

CROSS-REFERENCE TO RELATED APPLICATION

The present application claims priority to, and the benefit of, U.S. Provisional Application No. 63/292,503, which was filed on Dec. 22, 2021, and is incorporated herein by reference in its entirety.

FIELD OF THE INVENTION

The present invention relates generally to the field of garbage cans. More specifically, the present invention relates to a locking garbage can device primarily comprised of a garbage can body with at least one actuator catch, a lid comprised of at least one rod with at least one actuator magnet, and a housing with at least one housing magnet. The lid is comprised of a magnetic locking mechanism that repels the actuator magnet of the rod via like-poled magnetic fields into a catch located in the garbage can body, such that the lid cannot be removed from the body. By turning the housing, the housing spins such that a magnet with an opposite polarity of the actuator magnet of the rod attracts the rod towards the housing such that it disengages the catch, and the lid can be lifted from the body. Accordingly, the present disclosure makes specific reference thereto. Nonetheless, it is to be appreciated that aspects of the present invention are also equally applicable to other like applications, devices, and methods of manufacture.

BACKGROUND

Outdoor garbage cans can be difficult to secure. Wild animals like rodents, raccoons, opossums, etc., can make their way into a garbage can by opening the lid of the can and ultimately, spread trash around a property. In addition, rodents can carry serious diseases that can easily spread if a rodent infestation in a garbage can is left unattended. As a solution, individuals may try to tape garbage can lids shut or secure the lid via bungee cords or other fasteners. However, this process is cumbersome and impractical because it must be undone and redone every time garbage must be thrown in the garbage can. In addition, temporary fastening solutions may make a garbage can appear unsightly.

Therefore, there exists a long-felt need in the art for an improved garbage can. There also exists a long-felt need in the art for a locking garbage can device with a locking lid that prevents animals from entering the garbage can via dislodging the lid. Further, there exists a long-felt need in the art for a locking garbage can device with a locking lid that can be locked and unlocked quickly and easily. Further, there exists a long-felt need in the art for a locking garbage can device with a locking lid that preserves the appearance of a traditional garbage can.

The subject matter disclosed and claimed herein, in one embodiment thereof, comprises a locking garbage can device. The device is primarily comprised of a garbage can body with at least one actuator catch, and a lid comprised of at least one rod with at least one actuator magnet and a housing with at least one housing magnet. The lid is comprised of a magnetic locking mechanism. When turned in one position, the housing repels the actuator magnet of the rod via like-poled magnetic fields into a catch located in the garbage can body such that the lid cannot be removed from the body. By turning the housing again, the housing spins, such that a magnet with an opposite polarity of the actuator magnet of the rod attracts the rod toward the housing such that it disengages the catch and the lid can be lifted from the body.

In this manner, the locking garbage can device of the present invention accomplishes all of the foregoing objectives and provides a locking garbage can device with a locking lid that prevents animals from entering the garbage can via dislodging the lid. Further, the device can be locked and unlocked quickly and easily. In addition, the locking mechanism is concealed underneath the lid such that the device preserves the appearance of a traditional garbage can.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a locking garbage can device. The device is primarily comprised of a garbage can body with at least one actuator catch, and a lid comprised of at least one rod with at least one actuator magnet, and a housing with at least one housing magnet. The body may be any shape known in the art such as, but not limited to, square, cylindrical, etc., wherein at least one inner wall of the body is comprised of at least one actuator catch. In the preferred embodiment, the inner wall has two catches positioned opposite of one another on the inner wall. The lid is preferably the same shape as the opening of the garbage can body and fits over the opening. The lid may further have at least one handle that aids a user in removing the lid from the opening.

The underside of the lid is further comprised of a frame. At least one housing attaches to the frame via at least one axle such that the housing can rotate around the axle by grasping and turning at least one handle on the housing. The housing protrudes outward from the lid via a top opening such that the handle is accessible while the lid is fully seated around the opening. The housing is further comprised of at least one like-poled housing magnet and at least one unlike-poled housing magnet positioned at differing locations on the housing.

The frame is also comprised of at least two guides, wherein each of the two guides is positioned on either side of the housing. Each guide is preferably semi-circular in shape and secures at least one rod to the frame. In the preferred embodiment, the device has two rods, wherein one of each rod is on each side of the housing and each rod is comprised of at least one actuator magnet at the first end of each rod. The second end of each rod engages the actuator catch of the body.

The device is also comprised of a method of use. First, the lid is placed over the opening of the garbage can body. In this "unlocked" position, the unlike-poled housing magnet is magnetically connected to the actuator magnet of the rod. The unlike-poled housing magnet and the actuator magnet have opposite magnetic fields such that they are attracted to one another. The like-poled housing magnet and the actuator magnet have the same magnetic field such that they repel one another. By turning the housing using the handle, the housing rotates about the axle such that the unlike-poled magnet disengages the actuator magnet, and the like-poled housing magnet aligns with the actuator magnet in opposition. Because the like-poled magnet and actuator magnet repel one another, the rod is propelled into the actuator catch such that the lid cannot be opened, and the device is placed in a "locked" position. When a user desires to open the lid, they can turn the housing using the handle such that the housing rotates about the axle wherein the unlike-poled magnet aligns and re-engages with the actuator magnet and the like-poled housing magnet no longer aligns with the actuator magnet. As a result of the magnetic field formed between the unlike magnet and the actuator magnet, the rod will be propelled back toward the housing such that the rod disengages the lid and the lid can be separated from the body.

Accordingly, the locking garbage can device of the present invention is particularly advantageous as it provides a locking garbage can device with a locking lid that prevents animals from entering the garbage can by dislodging the lid. Further, the device can be locked and unlocked quickly and easily. In addition, the locking mechanism is concealed underneath the lid such that the device preserves the appearance of a traditional garbage can. In this manner, the locking garbage can device overcomes the limitations of existing garbage cans and garbage can securing methods known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
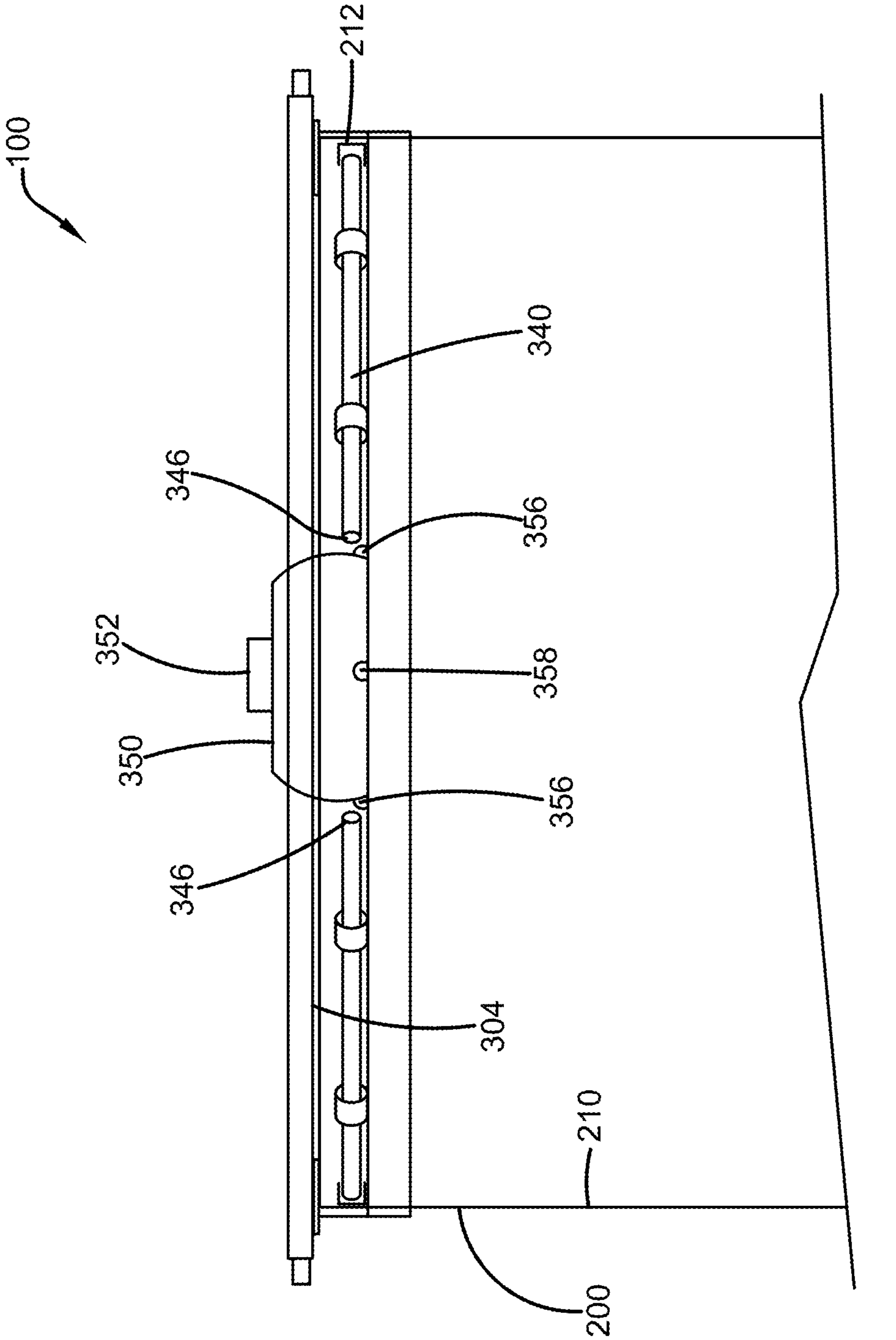
FIG. 1 illustrates a side cross-sectional view of one potential embodiment of a locking garbage can device of the present invention in a locked position in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for an improved garbage can. There also exists a long-felt need in the art for a locking garbage can device with a locking lid that prevents animals from entering the garbage can via dislodging the lid. Further, there exists a long-felt need in the art for a locking garbage can device with a locking lid that can be locked and unlocked quickly and easily. Further, there exists a long-felt need in the art for a locking garbage can device with a locking lid that preserves the appearance of a traditional garbage can.

The present invention, in one exemplary embodiment, is comprised of a locking garbage can device primarily comprised of a garbage can body with at least one actuator catch, and a lid comprised of at least one rod with at least one actuator magnet, and a housing with at least one housing magnet. The body may be any shape known in the art such as, but not limited to square, cylindrical, etc., wherein at least one inner wall of the body is comprised of at least one actuator catch. In the preferred embodiment, the inner wall has two catches positioned opposite of one another on the inner wall. The lid is preferably the same shape as the opening of the garbage can body such that it fits over the opening. The lid may further have at least one handle that aids a user in removing the lid from the opening.

The underside of the lid is further comprised of a frame, wherein at least one housing attaches to the frame via at least one axle such that the housing can rotate around the axle by grasping and turning at least one handle on the housing. The housing protrudes outward from the lid via a top opening such that the handle is accessible while the lid is fully seated around the opening. The housing is further comprised of at least one like-poled housing magnet and at least one unlike-poled housing magnet positioned at differing locations on the housing.

The frame is also comprised of at least two guides, wherein each of the two guides is positioned on either side of the housing. Each guide is preferably semi-circular in shape. Each guide secures at least one rod to the frame. In the preferred embodiment, the device has two rods, wherein one of each rod is on each side of the housing and each rod is comprised of at least one actuator magnet at the first end of each rod. The second end of each rod engages the actuator catch of the body.

The device is also comprised of a method of use, wherein the lid is first placed over the opening of the garbage can body. In this "unlocked" position, the unlike-poled housing magnet is magnetically connected to the actuator magnet of the rod. The unlike-poled housing magnet and the actuator magnet have opposite magnetic fields such that they are attracted to one another. The like-poled housing magnet and the actuator magnet have the same magnetic field such that they repel one another. By turning the housing using the handle, the housing rotates about the axle such that the unlike-poled magnet disengages the actuator magnet, and the like-poled housing magnet aligns with the actuator magnet in opposition. Because the like-poled magnet and actuator magnet repel one another, the rod is propelled into the actuator catch such that the lid cannot be opened, and the device is placed in a "locked" position. When a user desires to open the lid, they can turn the housing using the handle such that the housing rotates about the axle wherein the unlike-poled magnet aligns and re-engages with the actuator magnet and the like-poled housing magnet no longer aligns with the actuator magnet. As a result of the magnetic field formed between the unlike magnet and the actuator magnet, the rod will be propelled back toward the housing such that the rod disengages the lid and the lid can be separated from the body.

Accordingly, the locking garbage can device of the present invention is particularly advantageous as it provides a locking garbage can device with a locking lid that prevents animals from entering the garbage can by dislodging the lid. Further, the device can be locked and unlocked quickly and easily. In addition, the locking mechanism is concealed underneath the lid such that the device preserves the appearance of a traditional garbage can. In this manner, the locking garbage can device overcomes the limitations of existing garbage cans and garbage can securing methods known in the art.

Referring initially to the drawings, FIG. 1 illustrates a side cross-sectional view of one potential embodiment of a locking garbage can device 100 of the present invention in a locked position in accordance with the disclosed architecture. The device 100 is primarily comprised of a garbage can body 200 with at least one actuator catch 212, and a lid 300 comprised of at least one rod 340 with at least one actuator magnet 342 and a housing 350 with at least one housing magnet 356. In the preferred embodiment of the device 100, all components of the device 100 are made from a rigid plastic material such as, but not limited to, acrylic, polycarbonate, polyethylene, thermoplastic, acrylonitrile butadiene styrene, low-density polyethylene, medium-density polyethylene, high-density polyethylene, polyethylene terephthalate, polyvinyl chloride, polystyrene, polylactic acid, acetal, nylon, fiberglass, recycled plastic, biodegradable plastic, etc. The plastic material is preferably waterproof and UV-resistant to protect the device 100 from the weather. In a different embodiment, the device 100 may be made from a durable metal such as, but not limited to, stainless steel or aluminum.

The device 100 is comprised of a garbage can body 200. The body 200 may be any shape known in the art such as, but not limited to, square, cylindrical, etc. The body 200 may be any garbage can shape, size, and/or capacity known in the art. At least one inner wall 210 of the body 200 is comprised of at least one actuator catch 212, wherein the purpose of the catch 212 will be explained more fully below. In the preferred embodiment, the inner wall 210 has two catches 212 positioned opposite of one another on the inner wall 210.

Figure 2:
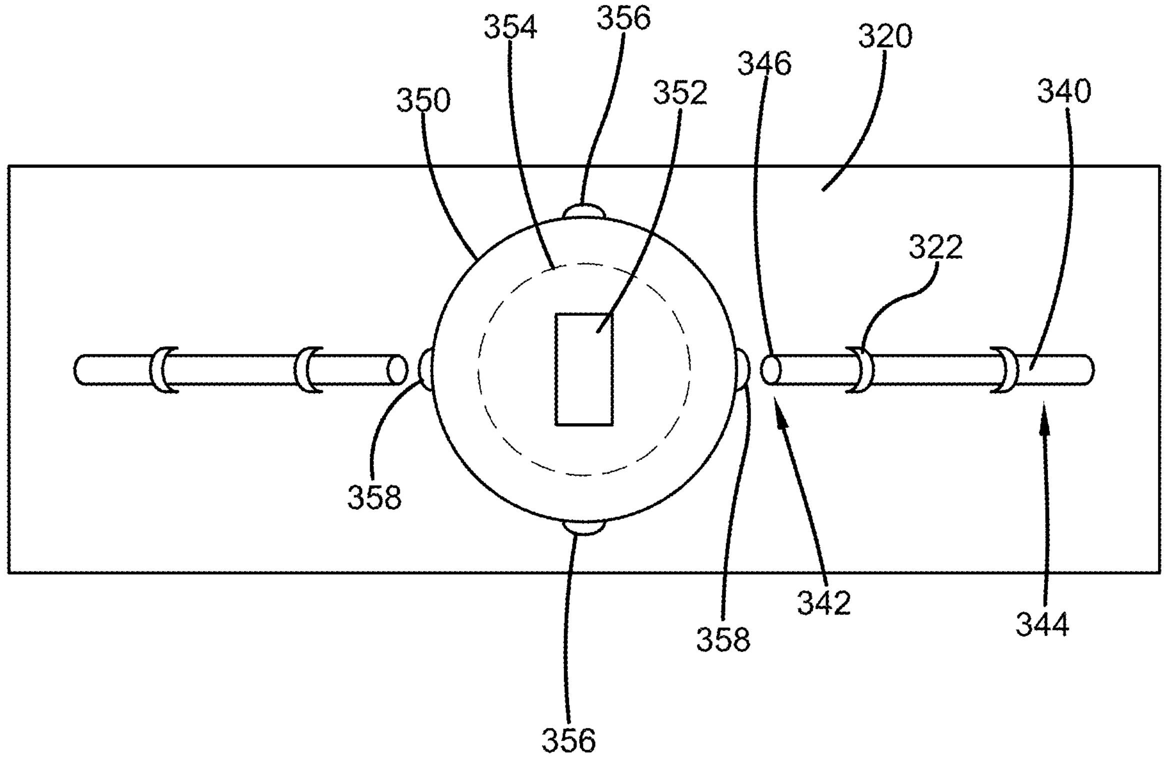
FIG. 2 illustrates a top view of a lid of one potential embodiment of a locking garbage can device of the present invention in accordance with the disclosed architecture.

FIG. 2 illustrates a top view of a lid 300 of one potential embodiment of a locking garbage can device 100 of the present invention in accordance with the disclosed architecture. The lid 300 is preferably the same shape as the opening 214 of the garbage can body 200. In the preferred embodiment, the opening 214 and lid 300 are both circular in shape wherein the lid 300 is greater in diameter than the opening 214 such that the lid 300 fits over the opening 300. The lid 300 may further have at least one handle 310 that aids a user in removing the lid from the opening 214.

The underside 304 of the lid 300 is further comprised of a frame 320. The frame 320 may be fixedly or removably attached to the underside 304. At least one housing 350 attaches to the frame 320 via at least one axle 354 such that the housing 350 can rotate 3600 around the axle 354 by grasping and turning at least one handle 352 on the housing 350. The housing 350 protrudes outward from the lid 300 via a top opening 302 such that the handle 352 is accessible while the lid 300 is fully seated around the opening 214. The opening 302 may be comprised of a waterproof gasket 306 that prevents water from entering the body 200 through the opening 302. The housing 350 is further comprised of at least one like-poled housing magnet 356 and at least one unlike-poled housing magnet 358 positioned at differing locations on the housing 350.

Figure 3:
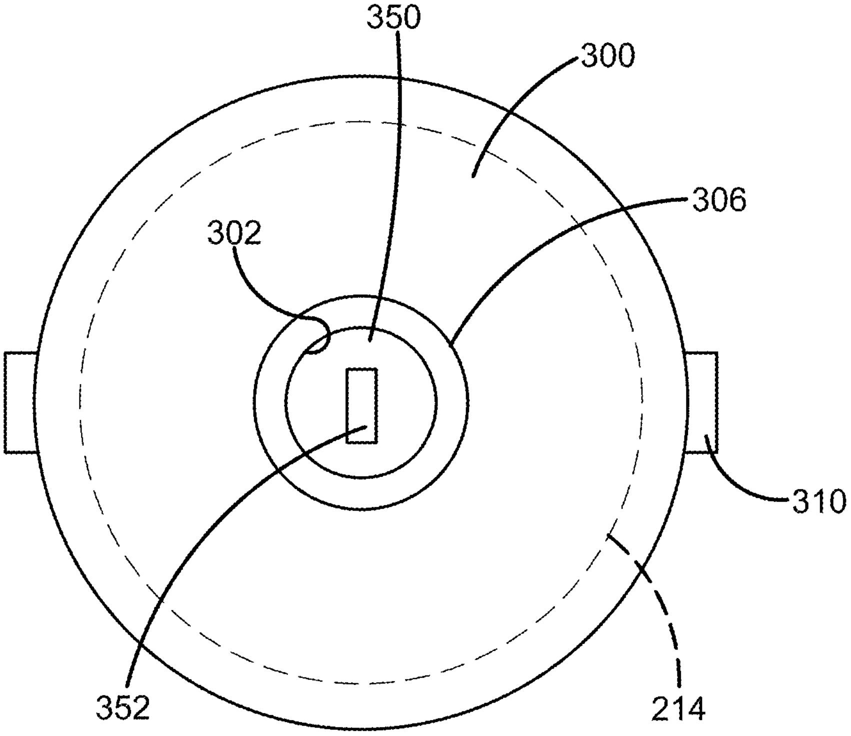
FIG. 3 illustrates a top view of one potential embodiment of a locking mechanism of a locking garbage can device of the present invention in an unlocked position in accordance with the disclosed architecture.

FIG. 3 illustrates a top view of one potential embodiment of a locking mechanism of a locking garbage can device 100 of the present invention in an unlocked position in accordance with the disclosed architecture. The frame 320 is also comprised of at least two guides 322, wherein each of the two guides 322 are positioned on either side of the housing 350. The guide 322 is preferably semi-circular in shape and secures at least one rod 340 to the frame 320. In the preferred embodiment, the device 100 has two rods 340, wherein one of each rod 340 is on each side of the housing 350. Each rod 340 is comprised of at least one actuator magnet 346 at the first end 342 of each rod 340. The second end 344 of each rod 340 engages the actuator catch 212 of the body 200, wherein the catch 212 may be generally L-shaped, circular, or any shape known in the art that receives the second end 344 of the rod 340.

Figure 4:
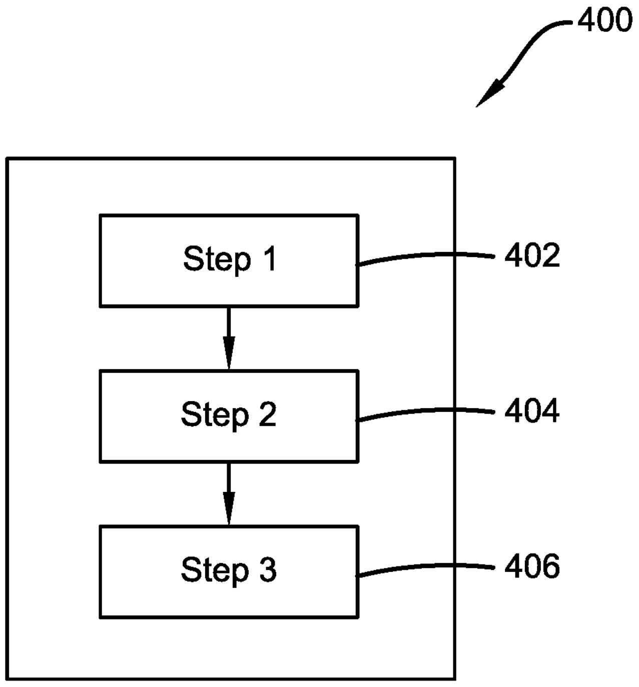
FIG. 4 illustrates a flow chart of a method of using one potential embodiment of a locking garbage can device of the present invention in accordance with the disclosed architecture.

FIG. 4 illustrates a flow chart of a method of using one potential embodiment of a locking garbage can device 100 of the present invention in accordance with the disclosed architecture. The device 100 is also comprised of a method 400 of use. First, the lid 300 is placed over the opening 214 [Step 402]. In the "unlocked" position, the unlike-poled housing magnet 358 is magnetically connected to the actuator magnet 346 of the rod 340. The unlike-poled housing magnet 358 and the actuator magnet 346 have opposite magnetic fields such that they are attracted to one another (i.e., the unlike magnet 358 has a positive field and the actuator magnet 346 has a negative field). The like-poled housing magnet 356 and the actuator magnet 346 have the same magnetic field such that they repel one another (i.e., the like magnet 356 has a negative field and the actuator magnet 346 has a negative field). Then, by turning the housing 350 using the handle 352, the housing 350 rotates about the axle 354 such that the unlike-poled magnet 358 disengages the actuator magnet 346 and the like-poled housing magnet 356 aligns with the actuator magnet 346 in opposition [Step 404]. Because the magnet 356 and actuator magnet 346 repel one another, the rod 340 is propelled into the actuator catch 212. When inside the catch 212, the rod 340 prevents the lid 300 from being opened (by striking the catch 212 if the lid 300 is pulled upward) and places the device 100 in a "locked" position. When a user desires to open the lid 300, they can turn the housing 350 using the handle 352 such that the housing 350 rotates about the axle 354, such that the unlike-poled magnet 358 aligns and re-engages with the actuator magnet 346 and the like-poled housing magnet 356 no longer aligns with the actuator magnet 346. As a result of the magnetic field formed between the unlike magnet 358 and the actuator magnet 346, the rod 340 will be propelled back toward the housing 350 such that the rod 340 disengages the lid 300 and the lid 300 can be separated from the body 200 [Step 406].

In differing embodiments of the device 100, the magnets 346,356,358 may be any magnet type known in the art such as, but not limited to, neodymium iron boron magnets, samarium cobalt magnets, alnico magnets, ceramic magnets, ferrite magnets, etc. In the preferred embodiment, the device has two like-poled magnets 356 opposite of one another on the housing 350 and two unlike-poled knob magnets 358 opposite of one another on the housing 350.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "locking garbage can device" and "device" are interchangeable and refer to the locking garbage can device 100 of the present invention.

Notwithstanding the foregoing, the locking garbage can device 100 of the present invention and its various components can be of any suitable size and configuration as is known in the art without affecting the overall concept of the invention, provided that they accomplish the above-stated objectives. One of ordinary skill in the art will appreciate that the size, configuration, and material of the locking garbage can device 100 as shown in the FIGS. are for illustrative purposes only, and that many other sizes and shapes of the locking garbage can device 100 are well within the scope of the present disclosure. Although the dimensions of the locking garbage can device 100 are important design parameters for user convenience, the locking garbage can device 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A locking garbage can device comprising:

a body comprised of a first catch and a second catch;

a lid having an opening and a handle;

a frame removably attached to an underside of the lid;

a housing comprised of a first magnet and a second magnet;

an axle rotatably attaching the housing to the frame;

a first rod comprised of a third magnet positioned on a proximal end of the first rod; and a second rod comprised of a fourth magnet positioned on a proximal end of the second rod; and wherein a distal end of the first rod is configured to engage the first catch and a distal end of the second rod is configured to engage the second catch; and wherein the housing protrudes outward from the lid via the opening and allows the handle to be accessible when the lid is seated around the opening.

2. The locking garbage can device of claim 1, wherein the device is comprised of a waterproof and a UV-resistant plastic.

3. The locking garbage can device of claim 1, wherein the first magnet, the third magnet, and the fourth magnet are comprised of a positive charge.

4. The locking garbage can device of claim 3, wherein the second magnet is comprised of a negative charge.

5. A locking garbage can device comprising:

a body comprised of a first catch and a second catch;

a lid comprised of an opening, a handle, and a waterproof gasket;

a frame removably attached to an underside of the lid;

a housing comprised of a first magnet of a first polarity and a second magnet of a second polarity;

an axle rotatably attaching the housing to the frame;

a first rod comprised of a third magnet positioned on a proximal end of the first rod with a third polarity identical to the first polarity; and a second rod comprised of a fourth magnet positioned on a proximal end of the second rod with a fourth polarity identical to the first polarity; and wherein the first rod is movably secured to the frame via a first pair of guides and the second rod is movably secured to the frame via a second pair of guides;

wherein a distal end of the first rod is configured to engage the first catch and a distal end of the second rod is configured to engage the second catch; and wherein the housing protrudes outward from the lid via the opening and allows the handle to be accessible when the lid is seated around the opening.

6. The locking garbage can device of claim 5, wherein the housing spins 360 degrees around the axle.

7. The locking garbage can device of claim 5, wherein the first catch and the second catch are comprised of an L-shape.

8. The locking garbage can device of claim 5, wherein the second polarity opposes the first polarity.

9. The locking garbage can device of claim 5, wherein the first catch and the second catch are positioned opposite one another on an inner wall of the body.

10. The locking garbage can device of claim 5, wherein the body is comprised of a circular opening.

11. The locking garbage can device of claim 5, wherein the lid is circular.

12. The locking garbage can device of claim 10, wherein the lid is larger in diameter than the opening.

* * * * *